Jan. 10, 1950 H. D. HUME 2,493,874
TRAILER HITCH
Filed Nov. 27, 1948 3 Sheets-Sheet 1
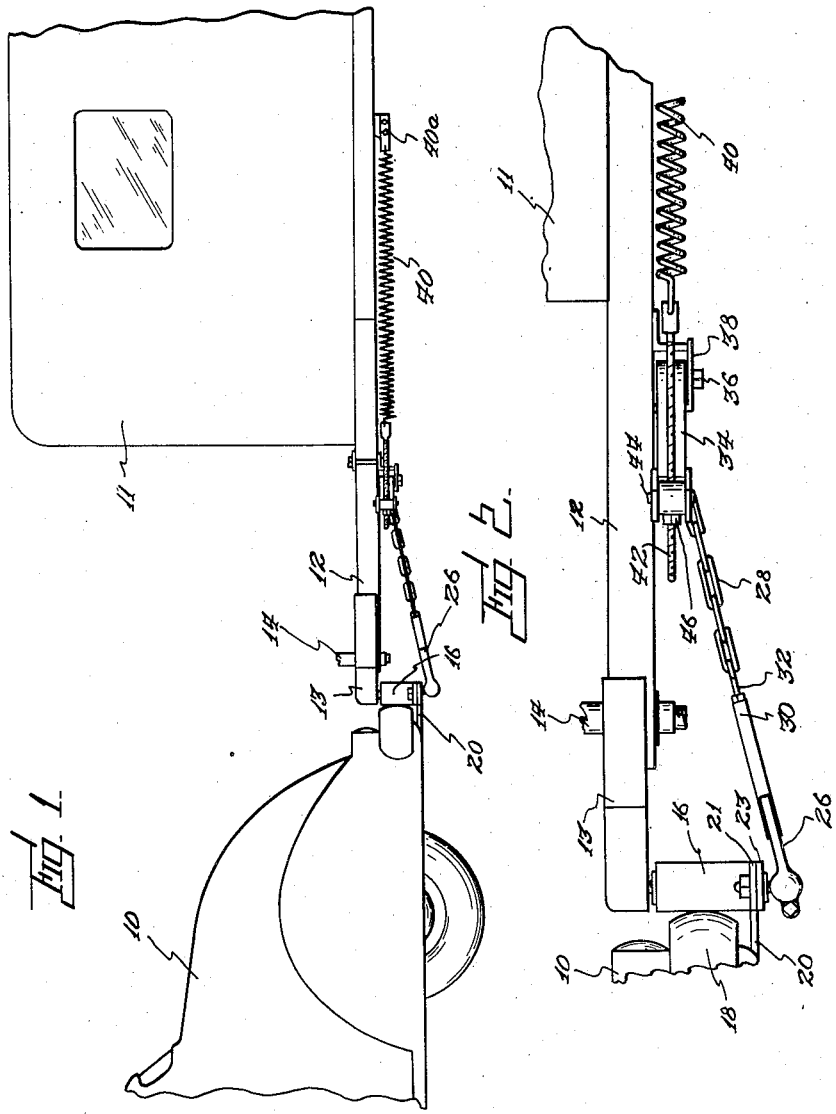
INVENTOR.
Horace D. Hume
BY
Smith & Wells

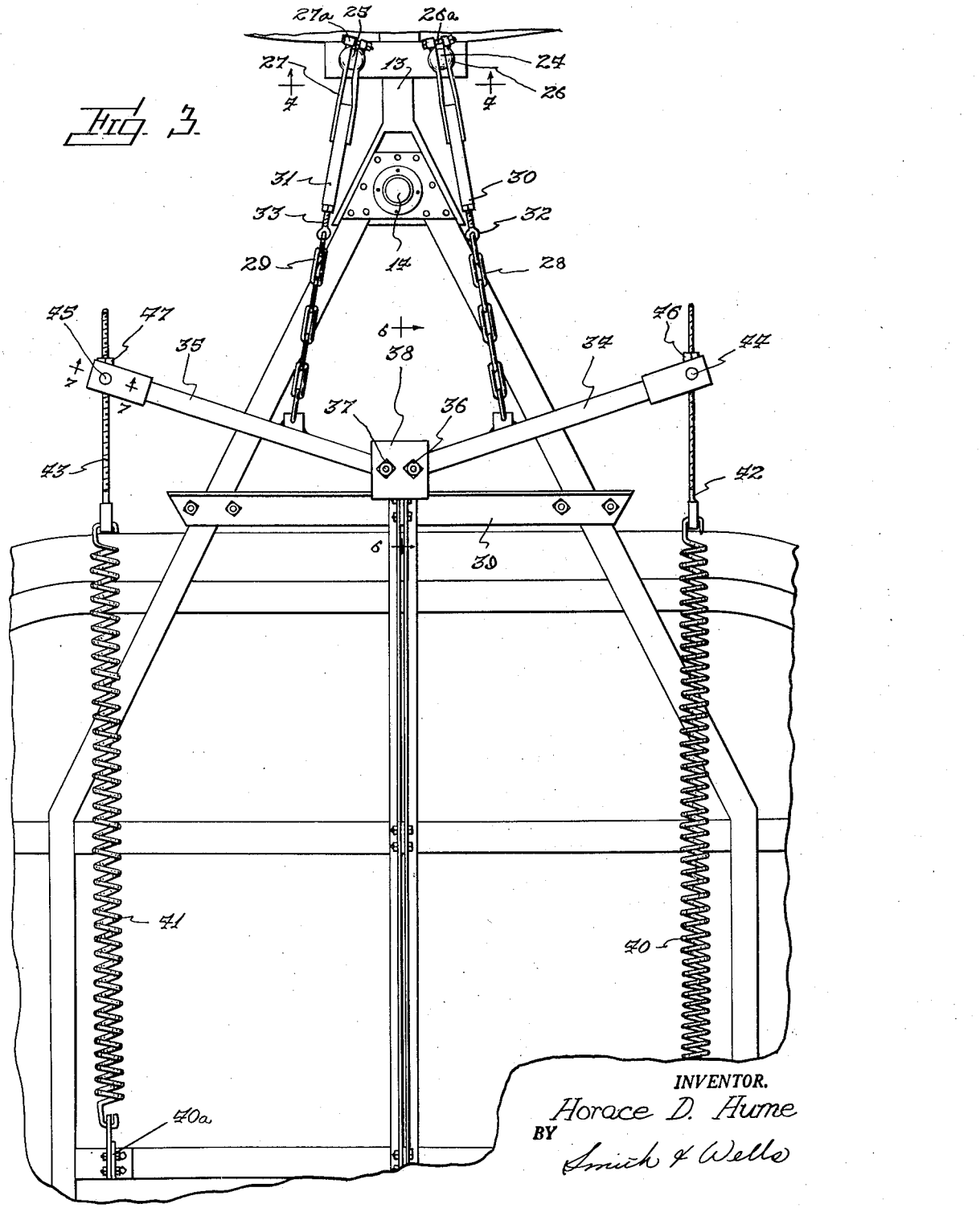

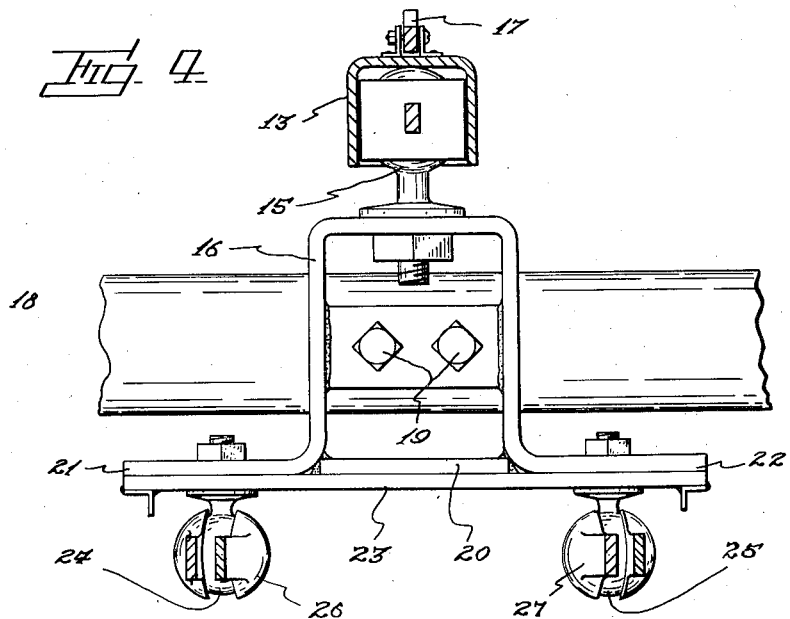
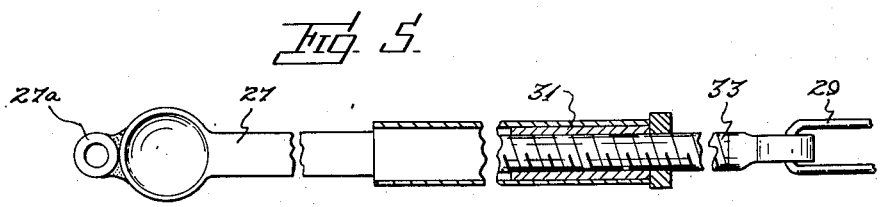
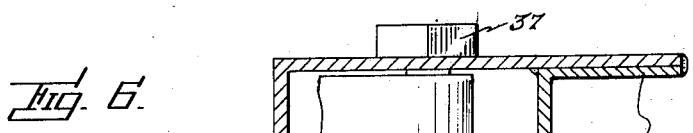
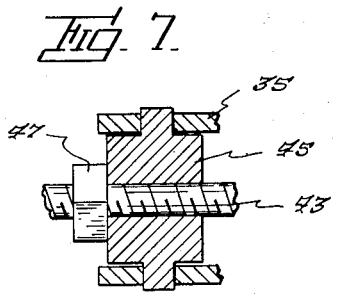

Patented Jan. 10, 1950

2,493,874

UNITED STATES PATENT OFFICE 2,493,874

TRAILER HITCH

Horace D. Hume, Mendota, Ill.

Application November 27, 1948, Serial No. 62,291

7 Claims. (Cl. 280—33.9)

The present invention relates to improvements in a trailer hitch.

In my patent application, Serial No. 785,269, filed November 12, 1947 for improvements in a Trailer hitch, I have disclosed a means for offsetting the tendency for side swaying and settling which is due to the weight and pull of the trailer on the rear end of the tow car. My present invention is directed to further improvements in a trailer hitch whereby a more effective control in preventing the trailer from swaying and bouncing is obtained together with a control of the degree of pressure that may be applied to the front axle of the tow car for determining good steering. It is a well known difficulty in pulling trailers that the front end of the tow car may at times be so lifted as to make it dangerously difficult to steer the car.

More specifically it is the purpose of my present invention to provide a novel mechanism whereby a tow car and trailer are joined by an universal joint and rigid connections from the joint to both the trailer and tow car, in combination with a resilient and flexible truss rod construction between the tow car and the trailer, which connection may be adjusted to provide a greater or less tendency to hold the front end of the tow car down. Other objects and advantages of my invention will appear more fully from the following description and the accompanying drawings of a preferred embodiment of my invention. It should be understood however, that the description and drawings are illustrative only and should not be considered as limiting the invention except insofar as it is limited by the claims.

In the drawings:

Figure 1 is a view in side elevation of a trailer and tow car connection embodying my invention;

Figure 2 is an enlarged fragmentary detailed view of a portion of the structure shown in Figure 1;

Figure 3 is a bottom plan view on an enlarged scale illustrating the connections between the tow car and trailer;

Figure 4 is an enlarged sectional view taken on the line 4—4 of Figure 3;

Figure 5 is a detailed sectional view of one of the connecting elements;

Figure 6 is an enlarged sectional view taken on the line 6—6 of Figure 3; and

Figure 7 is a fragmentary sectional view taken on the line 7—7 of Figure 3.

Referring now to the drawings and particularly to Figures 1, 2 and 3, the tow car is indicated at 10 and the trailer at 11. The front end of the trailer is extended as shown at 12 to a connecting bar 13. A jack member 14 is provided at the front end of the frame of the trailer for holding the front end of the trailer raised when it is disconnected from the tow car. The mechanism for operating the jack member 14 is not shown since it forms no part of the present invention and is well known.

The bar 13 is connected to a ball 15 which is mounted on a bracket 16 that is secured to the tow car. The connection between the bar 13 and the ball 15 is of well known construction and may be any universal or ball and socket arrangement which can be released to separate the trailer from the tow car. A release lever is illustrated at 17 in Figure 4 of the drawings.

The bracket 16 preferably is bolted to the bumper 18 of the tow car by means of bolts illustrated at 19. It is customary in the better towing attachments to provide a connecting bar 20 between the bracket 16 and the car frame. The bracket 16 is provided with oppositely directed lateral extensions 21 and 22 which are connected by a tie plate 23. Depending ball members 24 and 25 are bolted to the lateral extensions 21 and 22.

A ball and socket connection between the parts 13 and 15 provides an universal joint between the frame 12 which is rigid with the trailer and the bracket 16 which is rigid with the tow car. This universal joint permits the trailer to swing laterally with respect to the tow car and to move up and down or rock. The pull of the trailer on the universal joint and the weight of the trailer at the universal joint cause the rear end of the tow car to settle downward and also tend to lift the front end of the tow car off the ground. According to my invention, I connect two socket members 26 and 27 to the ball members 24 and 25. Bolts 26a and 27a hold the socket members on the ball members. The socket members 26 and 27 are connected to flexible members 28 and 29 by means of threaded sleeves 30 and 31 and eye bolts 32 and 33. The members 28 and 29 are shown as chains but any equivalent flexible member may be used. The members 28 and 29 are connected to lever arms 34 and 35 respectively on the trailer. The lever arms 34 and 35 are secured by pivot pins 36 and 37 to a bracket 38 that is fixed to a cross member 39 of the trailer frame. The points of connection of the members 28 and 29 to the arms 34 and 35 are about one third of the distance out from the pivots of the lever arms to their free ends.

The free ends of the arms 34 and 35 are connected to a pair of tension springs 40 and 41, the rear ends of which are secured to the trailer frame as illustrated at 40a. The springs are adjustably secured to the free ends of the lever arms 34 and 35 by bolts 42 and 43 which extend through pivoted blocks 44 and 45 that are mounted in the free ends of the lever arms 34 and 35. The tension of the springs 40 and 41 can be adjusted by means of the nuts 46 and 47 that are threaded onto the bolts 42 and 43.

The mechanism just described provides a flexible resilient truss construction between the trailer frame and the bracket 16. This truss construction can be made to exert more or less pull as desired by adjusting the tension of the springs 40 and 41, but in all adjustments, the effect of the truss construction is to exert a yielding force opposing the tendency of the trailer bar 13 to push down or depress the rear end of the tow car. Lateral swaying or rocking of the trailer with respect to the tow car is also opposed by the truss construction in a similar yielding fashion. The connection of the flexible members 28 and 29 to the lever arms 34 and 35 near the pivots of the lever arms enables me to use relatively light springs 40 and 41 of substantial length. The arrangement of the flexible members with the transversely extending arms spring held against the pull of the flexible members is simple and provides adequate adjustment for all purposes. The transversely extending arms may be combined with the springs in the form of a leaf spring anchored to the trailer frame at the center and having its ends attached to the flexible member.

Having thus described my invention, I claim:

1. A trailer hitch for coupling a trailer to a tow car comprising in combination a bracket having three connecting members thereon, one connecting member being spaced vertically above the other two connecting members, and the other two connecting members being spaced apart transversely of the tow car and on opposite sides of a vertical line through the first named connecting member, of a rigid draw bar fixed to the trailer and attached to the first named connecting member on said bracket by an universal joint, and resilient flexible connecting means, attached to the other two connecting members on the bracket by universal joints and to the trailer.

2. In a trailer hitch for coupling a trailer to a tow car wherein a draw bar on the trailer is connected to the tow car by an universal joint, transverse lever arms secured at one end to the trailer frame, below the level of the draw bar, spring means urging said arms away from the tow car and a member extending from each arm forwardly to the tow car and connected by an universal joint to the tow car at a point laterally of and substantially below the level of the draw bar connection to the tow car.

3. In a trailer hitch for coupling a trailer to a tow car wherein a draw bar on the trailer is connected to the tow car by an universal joint, transverse lever arms secured at one end to the trailer frame, spring means urging the other ends of said arms away from the tow car, and a flexible member connected to each arm intermediate its ends and extending forward to the tow car and connected thereto laterally of and below the universal joint.

4. In a trailer hitch for coupling a trailer to a tow car wherein a draw bar on the trailer is connected to the tow car by an universal joint, transverse lever arms secured at one end to the trailer frame, spring means urging the other ends of said arms away from the tow car, and a flexible member connected to each arm intermediate its ends and extending forward to the tow car and connected thereto laterally of and below the universal joint, said flexible members each having a socket thereon at the tow car end and the tow car having balls thereon on which the sockets mount.

5. In a trailer hitch a bracket adapted for attachment to a tow car and having an upper mounting member and two lower mounting members below and on opposite sides of the upper member, a rigid draw bar universally connected to the upper member and fixed to the trailer, transverse lever arms each pivoted at one end to the trailer, a spring secured to the other end of each arm and to the trailer urging said arms away from the tow car bracket, and connecting members extending from the lower mounting members to the lever arms and secured to the lever arms intermediate their ends.

6. In a trailer hitch a bracket adapted for attachment to a tow car and having an upper mounting member and two lower mounting members below and on opposite sides of the upper member, a rigid draw bar universally connected to the upper member and fixed to the trailer, transverse lever arms each pivoted at one end to the trailer, a spring secured to the other end of each arm and to the trailer urging said arms away from the tow car bracket, and connecting members extending from the lower mounting members to the lever arms and secured to the lever arms intermediate their ends, said connecting members each including a flexible portion.

7. In a trailer hitch a bracket adapted for attachment to a tow car and having an upper mounting member and two lower mounting members below and on opposite sides of the upper member, a rigid draw bar universally connected to the upper member and fixed to the trailer, transverse lever arms each pivoted at one end to the trailer, a spring secured to the other end of each arm and to the trailer urging said arms away from the tow car bracket, and connecting members extending from the lower mounting members to the lever arms and secured to the lever arms intermediate their ends, said connecting members each including a flexible portion and a portion extensible in length.

HORACE D. HUME.

No references cited.